United States Patent
Meinig

(10) Patent No.: US 7,661,730 B2
(45) Date of Patent: Feb. 16, 2010

(54) CLAMPING RING FOR CONNECTING THIN-WALLED TUBES

(75) Inventor: Manfred Meinig, Rietheim-Weilheim (DE)

(73) Assignee: Metu Meinig AG, Rietheim-Weilheim (DE)

( * ) Notice: Subject to any disclaimer, the term of this patent is extended or adjusted under 35 U.S.C. 154(b) by 0 days.

(21) Appl. No.: 11/913,533

(22) PCT Filed: May 4, 2006

(86) PCT No.: PCT/EP2006/004168

§ 371 (c)(1),
(2), (4) Date: Nov. 2, 2007

(87) PCT Pub. No.: WO2006/119913

PCT Pub. Date: Nov. 16, 2006

(65) Prior Publication Data

US 2008/0191465 A1    Aug. 14, 2008

(30) Foreign Application Priority Data

May 6, 2005    (DE) ................. 10 2005 021 646

(51) Int. Cl.
*F16L 23/00*    (2006.01)
(52) U.S. Cl. ................. 285/365; 285/424; 285/420
(58) Field of Classification Search ................. 285/424, 285/365, 366, 367, 420
See application file for complete search history.

(56) References Cited

U.S. PATENT DOCUMENTS

| | | | | |
|---|---|---|---|---|
| 2,219,161 A | * | 10/1940 | Jacobs | 285/365 |
| 2,457,077 A | * | 12/1948 | Woolsey | 285/367 |
| 2,937,893 A | | 5/1960 | Hill et al. | |
| 3,235,293 A | * | 2/1966 | Condon | 285/367 |
| 3,791,681 A | * | 2/1974 | Moldow | 285/424 |
| 3,822,075 A | * | 7/1974 | Duncan | 285/367 |
| 4,163,270 A | | 7/1979 | Marus | |
| 4,185,858 A | * | 1/1980 | Peash | 285/367 |
| 4,461,499 A | * | 7/1984 | Hunter et al. | 285/424 |
| 4,579,375 A | * | 4/1986 | Fischer et al. | 285/424 |
| 6,109,665 A | | 8/2000 | Meinig | |

(Continued)

FOREIGN PATENT DOCUMENTS

DE    2 230 991 A1    1/1974

(Continued)

*Primary Examiner*—David E Bochna
(74) *Attorney, Agent, or Firm*—Akerman Senterfitt; Peter A. Chiabotti

(57) ABSTRACT

An open clamping ring (11) is provided for connecting tubes (1) that are provided with terminal flanges (2). The clamping ring is drawn together with the aid of a clamping lock that is provided at the open ends of the clamping ring. The clamping (10) substantially has the shape of a U whose legs that are composed of an inner leg section (12) and an outer leg section (14) are bent such that a clamping edge (13) is formed in the central area between the leg sections (12 and 14). The inventive clamping ring (10) thus approximately has the shape of an X. The clamping edges (13) rest more or less linearly on the outside of the final flange sections (2a) such that the friction between the clamping ring (10) and the terminal flanges (2) is reduced when the clamping ring is assembled while force is transmitted and distributed in an optimal manner.

8 Claims, 9 Drawing Sheets

U.S. PATENT DOCUMENTS

| | | | |
|---|---|---|---|
| 6,877,780 B2 * | 4/2005 | Potts et al. | 285/420 |
| 6,938,933 B2 * | 9/2005 | Starita | 285/365 |
| 7,004,512 B2 * | 2/2006 | Antonelli et al. | 285/365 |
| 7,073,826 B2 * | 7/2006 | Meinig | 285/365 |

FOREIGN PATENT DOCUMENTS

| | | |
|---|---|---|
| DE | 35 37 504 C1 | 7/1987 |
| DE | 197 28 655 A1 | 2/1999 |
| DE | 200 01 270 U1 | 8/2000 |
| GB | 591 284 A | 8/1947 |
| GB | 1 579 421 A | 11/1980 |

* cited by examiner

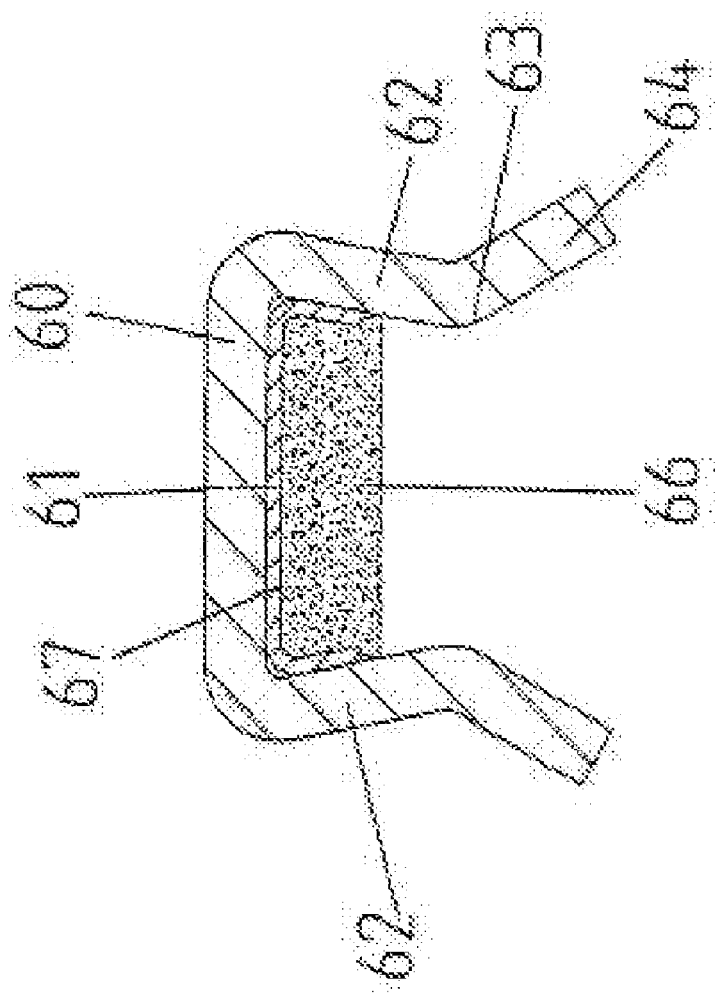

CLAMPING RING FOR CONNECTING THIN-WALLED TUBES

CROSS REFERNCE TO RELATED APPLICATION

This application is a §371 National Phase of PCT/EP2006/004168, filed May 4, 2006, the entirety of which is incorporated by reference.

The invention relates to an open clamping ring, which serves the connection of thin-walled pipes comprising terminal flanges. For the clamping of this clamping ring a clamping lock is provided, which is used to draw the ends of the clamping ring together.

BACKGROUND

Thin-walled pipes, as they are used, for example, in exhaust, air conditioning and ventilation technology, are increasingly provided with profiled sheet metal flanges, which are drawn together with the above-mentioned clamping rings and are connected to each other in this way.

In general, a screw having a correspondingly long screw length or a lever lock is sufficient to close this clamping ring quickly and easily. This type of connection saves considerable assembly time compared to the time that is required for connecting flanges made of flat or angle steel, which must be connected to each other with a plurality of individual screws.

The terminal flanges can be profiled sheet metal flanges that are placed onto the ends of the pipes or are integrally formed thereon. Clamping rings suited for connecting these flanges have different cross-section profiles, depending on the type of seal. The most widely used clamping rings have V-shaped cross-sectional profiles. U-shaped cross-sectional profiles or other shapes are found less frequently.

The simplest form of an integrally formed flange is the stay flange. To produce these flanges, the pipe end is folded outward at a suitable angle or crimped by means of rolling tools. To connect such flanges configured as stay flanges, a simple clamping ring configured as a clamping ring for spiral-seam tubes.

While this type of connection is inexpensive, it is neither air-tight nor stable.

To produce air-tight and more stable connections, clamping rings having a V-shaped or U-shaped cross-section are better suited, into which a sealing tape to produce the air tightness can be inserted.

The sealing tape can also be inserted between the surfaces of the terminal pipe flanges facing each other.

Clamping rings of this type are also in principle suited for connecting flanges having circular cross-sections, which are typically crimped at the ends of the pipes.

If higher tightness and stability are required, conical pipe flanges are better suited, which are connected to each other by placing on clamping rings having a V-shaped cross-section. These pipe flanges can also either be placed on or integrally formed. With this type of connection, the sealing effect is achieved by inserting sealing tape either in the apex region or between the flange surfaces facing each other.

These conical flange connections have therefore proven very useful in practice because during assembly the pipe ends are not only pulled axially toward each other, but are also radially oriented by means of the flange ring. This dual function is met best if the exterior surfaces of the pipe flanges and accordingly the interior surfaces of the clamping rings have an inclination of approximately 60° in relation to the pipe wall.

Despite the advantages described above, however, also this type of connection is still associated with considerable deficiencies, namely:

a) When drawing the clamping ring together, considerable frictional resistance must be overcome. The reason for this is that the conical exterior pipe flange surfaces and the corresponding interior clamping ring surfaces rest against each other across large surfaces on the entire circumference, resulting in considerable friction because the surfaces are generally galvanized, which is to say rough. Once the clamping ring is closed enough that the above-mentioned surfaces have a force-fit contact, the tensile force of the only clamping force is no longer sufficient to completely draw the clamping ring together across the entire circumference. Rather, the tension force develops exclusively in the region of the clamping lock, because it is not forwarded into the more remote region of the surfaces due to the high friction. As a result, the clamping ring and consequently the pipe flange are deformed unevenly.

As a result of the uneven tension force distribution, the seal glued into the apex of the clamping ring having a V-shaped cross-section is compressed with varying pressure levels, leading to a worse sealing effect.

Attempts are made during assembly to achieve an improved, meaning more symmetrical, distribution of the tension force by lightly tapping on the outer circumference of the clamping ring with a rubber mallet. Apart from the fact that this procedure delays the assembly, this measure does not offer sufficient guarantee for even tension force distribution as well as even sealing.

b) A further disadvantage is that also at the face flange surfaces the above-mentioned frictional resistance occurs, particularly if a friction-increasing seal is glued onto one of these flange surfaces. Once the clamping ring is being closed, the flanges are drawn axially toward each other by means of their beveled flanges. The seal between the flange surfaces is compressed before the radially centering effect occurs in the region of the apex of the clamping ring with the V-shaped cross-section. The consequence is that the pipe axes and therefore the pipe walls are not aligned, but rather offset from each other. Even with further tightening of the clamping ring they cannot be aligned any more because this is prevented by the friction of the flange surfaces and/or of the seal.

As a result, a step forms on the inside of the pipe when the connection is closed, the step interfering with the air flow and leading to deposits in this region, making subsequent cleaning more difficult.

The same problem occurs even in flange connections in which a foamed rubber seal is glued into the apex of the clamping ring, because the pressure of the comparatively soft seal is not sufficient to align the pipe axes against the friction of the flange surfaces.

c) A further problem for clamping rings having V-shaped cross-sections is that the alignment of the pipe flanges to be connected to each other, namely the transverse displacement of the two pipe flanges in the radial direction up to the V-apex of the clamping ring of the seal glued in this region, entirely depends on when the faces of the flanges come in contact. Even minor form errors of these flanges, which are relatively frequent with such sheet metal profiles, mean that the penetration depths of the two pipe flanges no longer agree, resulting in the axial shifting effect explained in b). In order to take these circumstances into account, which is to say to compensate for the deviations, a high, soft and flexible seal must be used, which is glued into the V-apex of the clamping ring. For this application, foam seals are suited. While these seals provide a sufficient sealing effect for common mean air pressures found in ventilation technology, they are completely unsuited for extremely high pressures or even for water-tight and oil-tight seals.

SUMMARY

It is therefore the object of the invention to create a clamping ring of the type explained above, which does not have these disadvantages. This clamping also has a substantially U-shaped cross-section, comprising a center cross-member extending substantially parallel to the face edges of the terminal flanges, the member comprising leg sections on both sides, which rest against the terminal flanges of the pipes to be connected to each other.

This problem is solved in a simple manner by a clamping ring of this type, the leg sections of the ring comprising clamping edges that extend in the circumferential direction, protrude in the direction of the terminal flanges and only come in linear contact with the latter.

These clamping edges on the one hand guarantee reliable transmission of the tension force and on the other hand result only in relatively low frictional resistance due to the linear contact. In this way, it is ensured that upon generation of the tension force by means of a single clamping lock the tension forces are transmitted symmetrically to the terminal flanges, guaranteeing an optimized alignment of the pipes to be connected in the radial direction.

The embodiment of the clamping ring is particularly expedient, wherein the leg sections have a flat V-shaped cross-section, the inner section connected to the center cross-member enclosing an angle of less than 90° with said member and an outer section projecting at an angle greater than 90° following thereon, wherein the abutment site between these two sections forms the above-mentioned clamping edge.

A clamping ring of this type overall has a substantially X-shaped configuration.

The proposed idea according to the invention offers a variety of design possibilities.

If the distance of mutually opposed clamping edges corresponds to exactly twice the thickness of the terminal flanges of the pipes to be connected, the clamping ring must be made of a material allowing little elastic deformation.

A clamping ring with elastic, resilient leg sections can be used if the distance of the clamping edges measured in the axial direction of the pipes is smaller than twice the thickness of the terminal flanges of the pipes to be connected. In this case, the terminal flanges are held together by the resilient leg sections of the clamping ring.

A particularly advantageous seal is achieved by means of a sealing tape, which is inserted in the clamping ring between the interior surface of the center cross-member and the faces of the terminal flanges.

This sealing tape may have a rectangular cross-section and should not be firmly connected to the clamping ring, but instead should be displaceable in the circumferential direction.

To further improve the sealing effect, it is advantageous if the distance between the ends of the sealing ring is smaller than the distance between the ends of the clamping ring.

So as to bridge the region beneath the clamping lock, namely between the open ends of the clamping ring, it is proposed to insert a bridge element that is adapted to the inside cross-section of the clamping ring in this region displaceably in the circumferential direction.

This bridge element is given particular stability if the bridge element is a profiled ring having a U-shaped cross-section, preferably made of sheet metal, which is inserted between the inside of the center cross-member and the sealing tape.

The subject matter of the invention will be explained hereinafter with reference to preferred exemplary embodiments of the clamping ring, wherein:

BRIEF DESCRIPTION OF THE DRAWING

FIG. 9 is a cross-section of the clamping ring along line IX-IX according to FIG. 8.

DETAILED DESCRIPTION OF THE PREFERRED EMBODIMENTS

Figure 1:
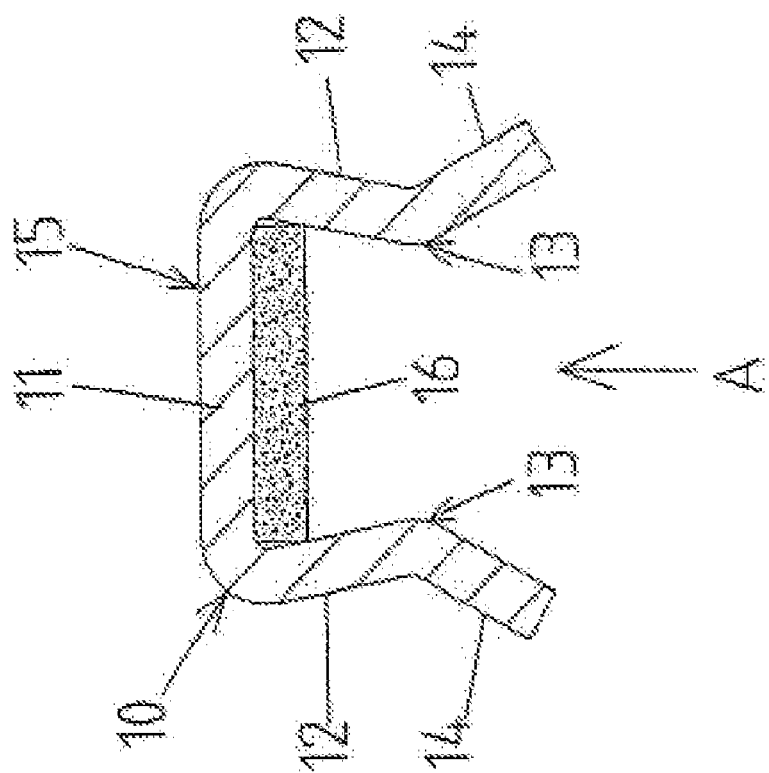
FIG. 1 is a cross-section of a clamping ring according to a first embodiment of the invention.
Figure 2:
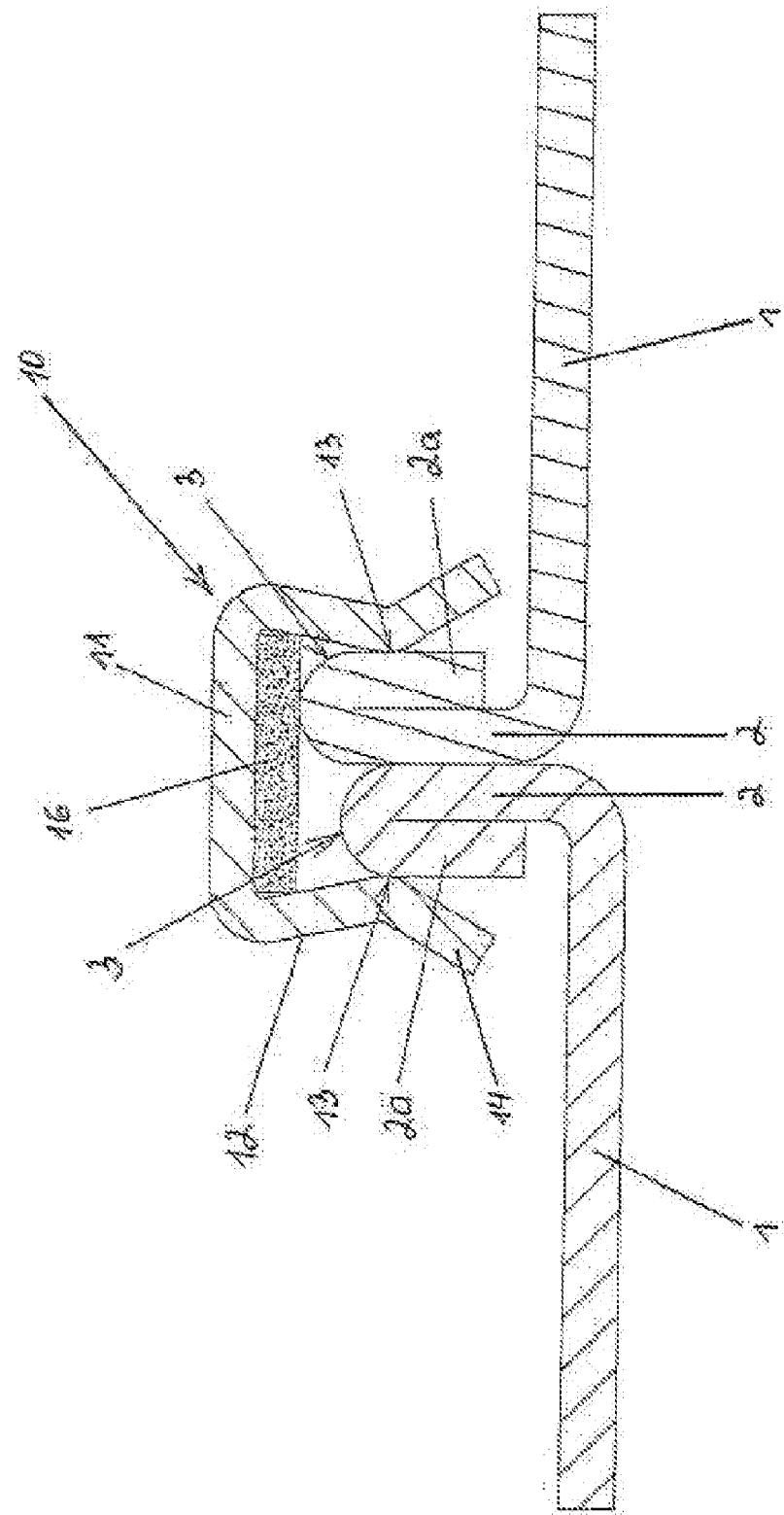
FIG. 2 is a cross-section of a clamping ring according to FIG. 1 to be placed on the terminal flanges of two pipes to be connected to one another, wherein the pipes are also radially offset in relation to one another.
Figure 3:
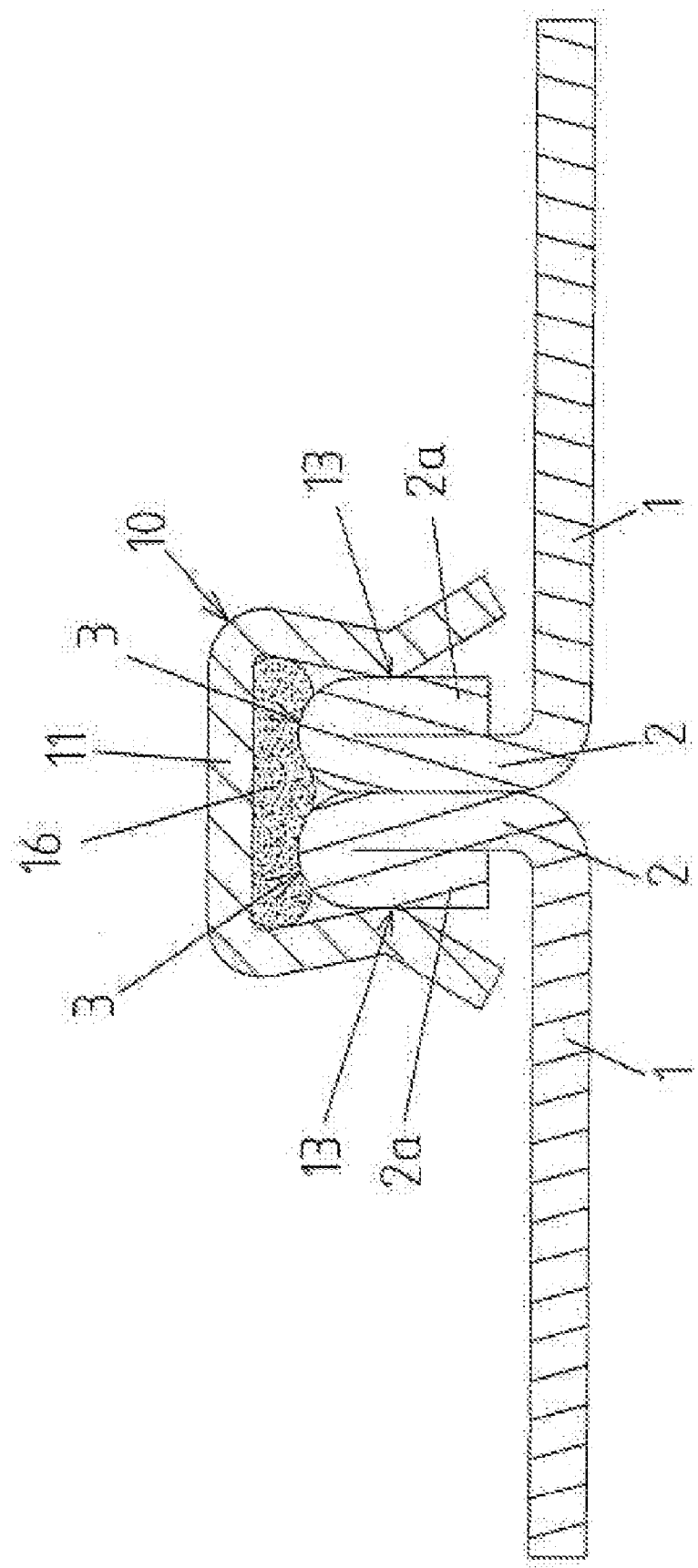
FIG. 3 is a configuration according to FIG. 2 with the clamping ring drawn together and radially aligned pipes.

The clamping ring shown in a cross-sectional view in FIG. 1 is a substantially U-shaped profiled sheet metal ring 10 comprising a center cross-member 11 and legs 12 to 14 on both sides. These legs comprise an inner leg section 12 and an outer leg section 14, which have a flat V-shaped cross-section and form a clamping edge 13 at the abutment location. The inner leg sections 12 together with the center cross-bar 11 enclose an angle smaller than 90°, while the outer outwardly projecting leg sections 14 together with the inner leg sections 12 enclose an angle greater than 90°. In this way, the outer leg sections 14 form insertion tapers for the terminal flanges 2 shown in FIGS. 2 and 3, wherein the flanges are drawn into the clamping ring 10 in the direction A when the clamping lock is closed. On the inside of the center cross-bar 11 a sealing tape 16 is provided, which ensures the sealing of the terminal flanges 2 on the face, which is illustrated in FIGS. 2 and 3. The center cross-bar 11 is relatively wide and is substantially level, so that a clamping lock can be attached to the outside 15 thereof in a simple manner, for example by welding, riveting or pressure-joining. FIGS. 2 and 3 illustrate the operating principle of the inventive clamping ring 10, which is placed on the terminal flanges 2 of the pipes 1 to be connected, the flanges being configured as double-walled stay flanges.

In the illustration according to FIG. 2, the ends of the two pipes 1 or the terminal flanges 2 thereof are still radially offset, the clamping ring 10 has not been drawn together yet. In this exemplary embodiment, the clamping ring 10 is made of relatively inflexible material, preferably steel, wherein the ring is dimensioned such that the axial distance of the clamping edges 13 corresponds to the entire cross-section of the terminal flanges. The clamping edges 13 rest on the outside of the terminal sections 2a of the terminal flanges 2 in a force-fit manner and thereby hold the flanges together in the axial direction. When tensioning the clamping ring 10 by means of the clamping lock, which is not shown, the pipes 1 with the terminal flanges 2 thereof are oriented radially until the pipes are axially aligned and the flanges 2 with the faces 3 thereof are inserted in the sealing tape 16. In this clamping ring configuration, the functions are clearly assigned, wherein the functions of radial orientation and axial tensioning are independent from each other and do not impair each other until the final position shown in FIG. 3 has been reached.

FIG. 2 shows that in the initial stage of the closing process the clamping ring 10 first only rests on the outsides of the terminal flange sections 2a with the clamping edges 13 and hereby holds the ends together axially.

The radial orientation is not performed until the clamping ring closes further, when the terminal flanges 2 with the faces 3 thereof come in contact with the sealing tape 16, as is apparent from FIG. 3. The radial orientation is hardly impaired by the friction mentioned at the beginning, or only little, since the flat flange regions rest on each other more or less pressure-free and the clamping ring rests on the outside surfaces of the terminal flange sections 2a not areally, but only linearly with the clamping edges 13.

The crucial advantage of the inventive clamping ring is consequently that the closing force produced by means of the clamping lock is not used for axially drawing the flanges together, but is initially used fully for pressing the face flange surfaces 3 into the sealing tape 16 in a sealing manner. Unlike in known clamping rings, the closing force is distributed evenly across the entire circumference since the friction between the clamping ring 10 and the terminal flanges 2 due to the linear contact of the clamping edges 13 with the outside surface of the terminal flange sections 2a is low.

Another advantage of this clamping ring is that the sealing tape 16 can be made of any sealing material that is ideally suited for the respective requirements. It can be simple and inserted without adhesion because it is held radially by the oblique inner leg sections 12.

As a result, the sealing tape 16 can be freely displaceable in the circumferential direction of the clamping ring 10, which is particularly advantageous during the closing process in the region of the clamping lock.

The comparison of FIGS. 2 and 3 shows that after closing the clamping ring the two pipes 1 with the flanges 2 thereof are radially oriented, so that a step between the abutting terminal flanges 2 is avoided. The configuration of the clamping ring according to FIGS. 1 to 3 requires the use of a relatively inflexible material so that the leg sections 12 to 14 do not rebound or only little in the axial direction.

Figure 4:
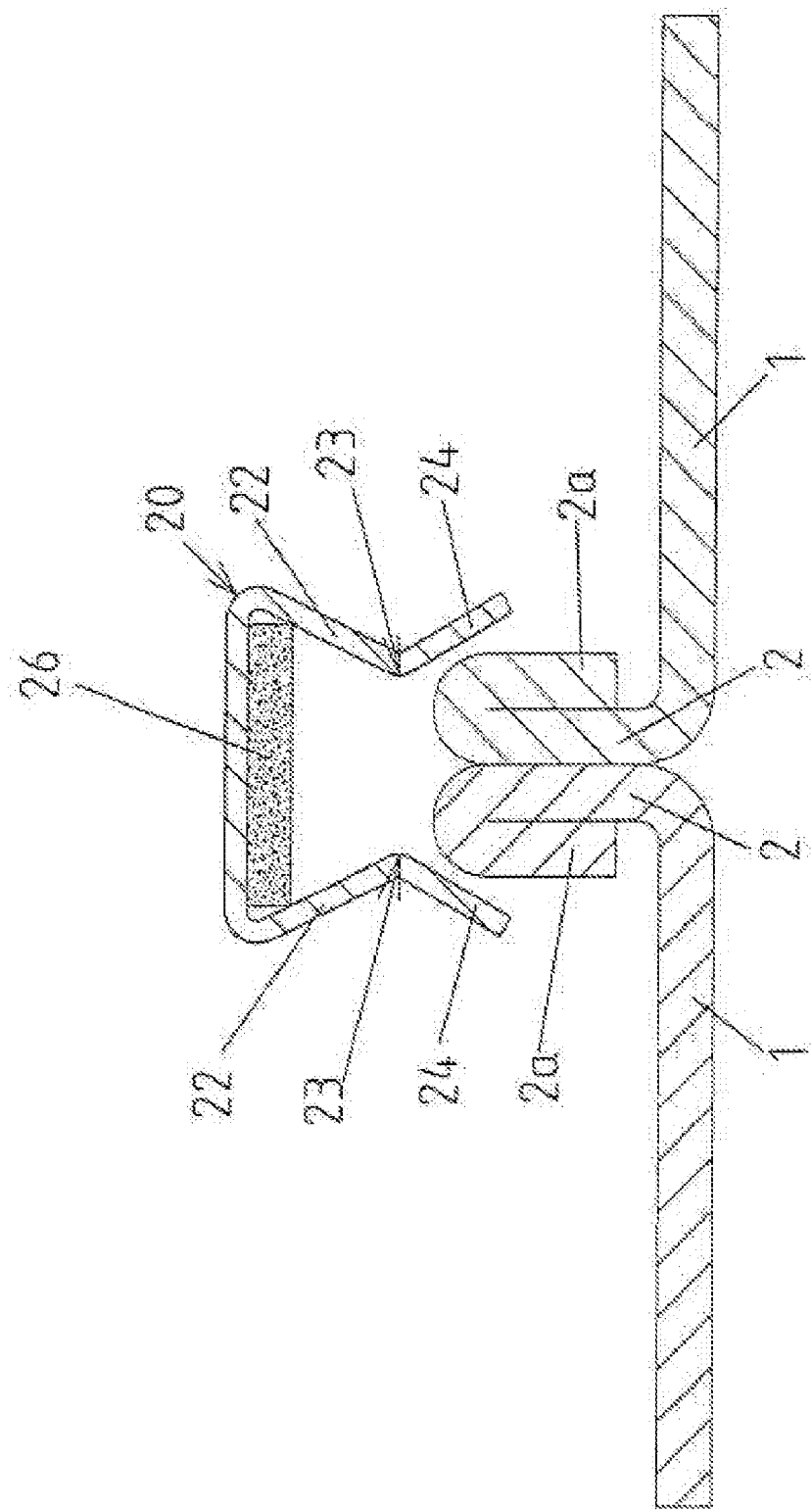
FIG. 4 is a cross-section of an elastic clamping ring according to a second embodiment with pipe flanges suited for the same.
Figure 5:
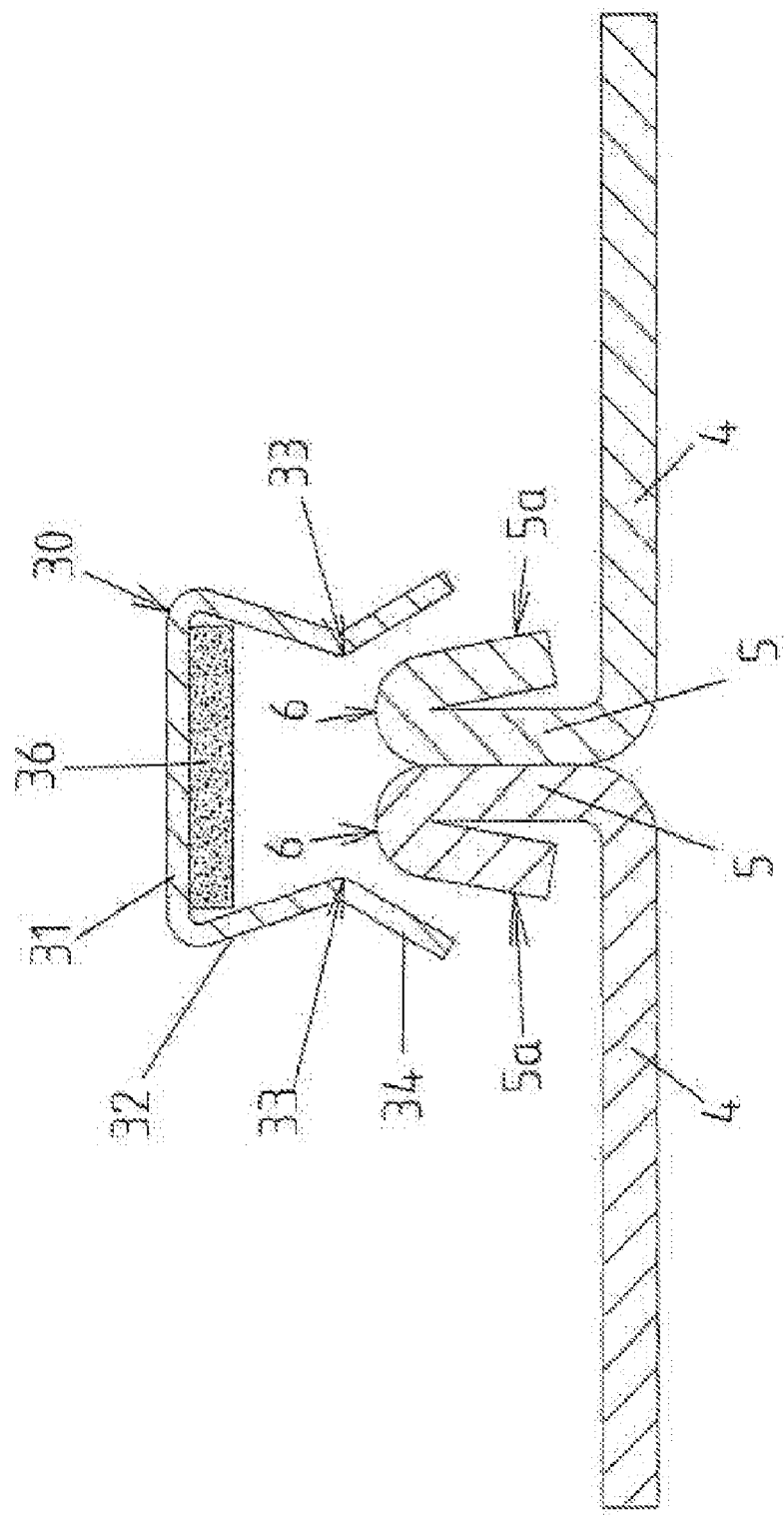
FIG. 5 is a cross-section of an elastic clamping ring according to a third embodiment with pipe flanges suited for the same.
Figure 6:
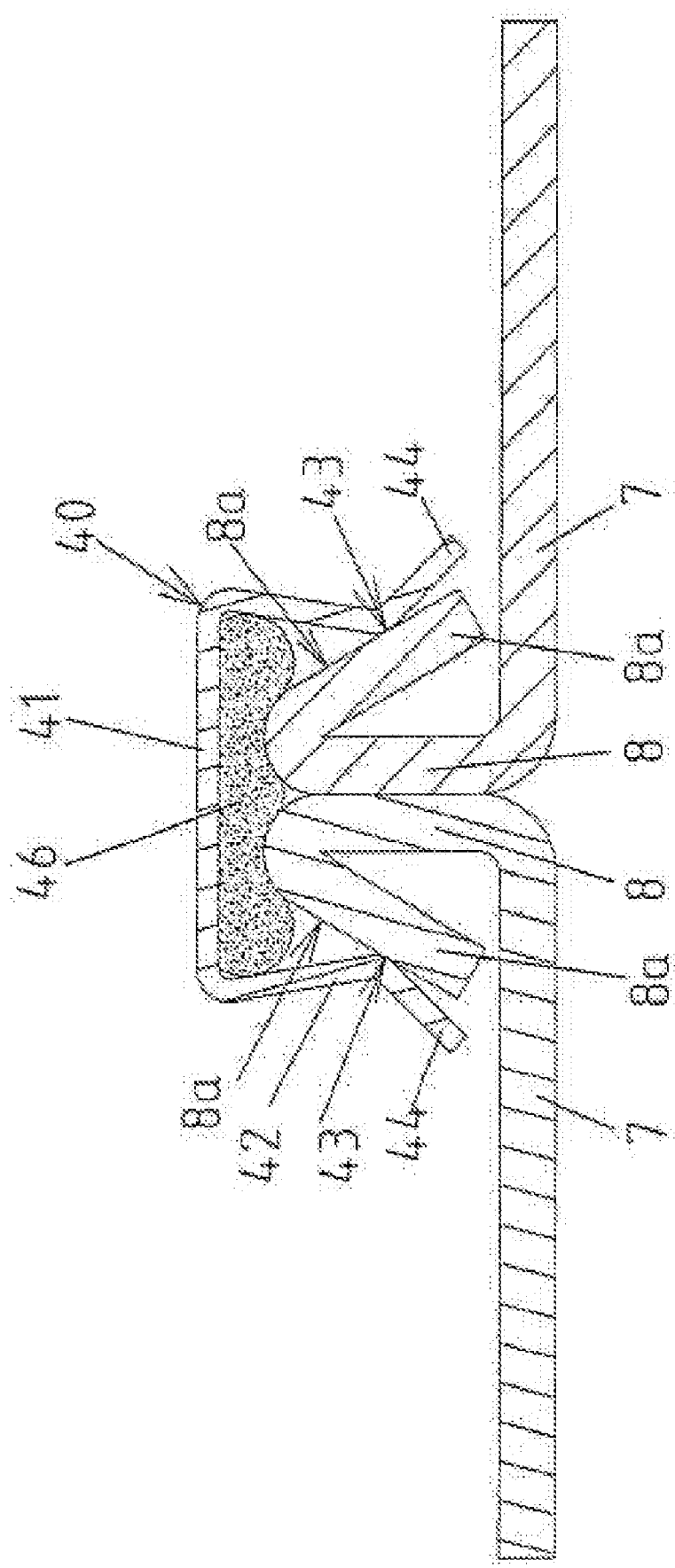
FIG. 6 is a cross-section of an elastic clamping ring according to a fourth embodiment, which is placed on the pipe flanges connected to each other.

In the exemplary embodiments illustrated in FIGS. 4 to 6, clamping rings 20, 30 or 40 made of elastic material are provided. In this case, the distance between the clamping edges 23, 33 or 43 must be smaller than the distance between the outer surfaces of the terminal sections 2a, 5a or 8a, at least in the final position of the clamping rings.

When closing the clamping ring 20 according to FIG. 4, the legs 22 to 24 are widened in the axial direction, wherein the clamping edges 23 rest on the outer surfaces of the terminal flange sections 2a with axial prestress.

A variation of the clamping ring 20 according to FIG. 4 is the clamping ring 30 shown in FIG. 5, which serves the connection of flanges 5 with a slightly conical profile shape, meaning angularly projecting terminal flange sections 5a. Also in this configuration, the axial distance of the clamping edges 33 must be slightly smaller than the axial distance of the surfaces of the terminal flange sections 5a when the clamping ring 30 is closed, meaning in the final position shown substantially in FIG. 6. In this final position, the legs 32 to 34 of the clamping ring 30 are axially sprung back, so that the clamping edges 33 rest on the surface of the terminal sections 5a with prestress.

A further variant of the clamping 30 shown in FIG. 5 is illustrated in FIG. 6. The clamping ring 40 shown here is dimensioned such that it is suited for connecting conical flange connections. In these conical flange connections, the terminal section 8a of the terminal flanges 8 provided in the pipes 7 has a greater inclination in relation to the flange plane than in the flange connections shown in FIG. 5. It is absolutely essential, however, that the angle of inclination of the surface of the terminal section 8a, which corresponds to the conical flange surface, is at least 5° smaller than the angle of inclination of the lower leg sections 44. It must be ensured that the legs 42 to 44 rest linearly on the surface of the terminal flange sections 8a, which is to say on the conical flange surfaces, exclusively with the clamping edges 43. Only in this way can excessive friction be avoided between the clamping ring 40 and the terminal flanges 8.

Figure 7:
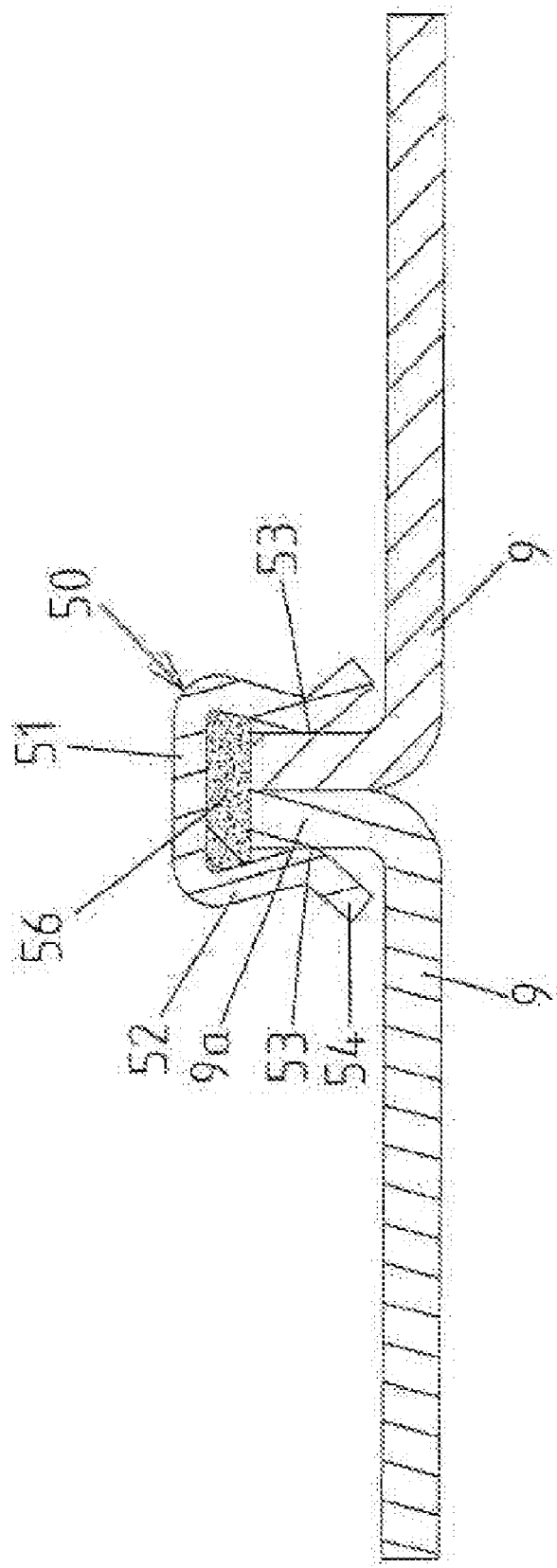
FIG. 7 is a cross-section of a clamping ring according to a fifth embodiment, which is placed on the stay flanges connected to each other.

Finally, FIG. 7 illustrates that an inventive clamping ring 50 can also be used to connect flanges in the simplest form, namely stay flanges 9a integrally formed on the pipes 9. In this case, the clamping ring 50 as in the embodiment according to FIGS. 1 to 3 must be made of an inelastic or relatively inelastic material, wherein the axial distance of the clamping edges 53 corresponds to the overall thickness of the flanges 9a.

Figure 8:
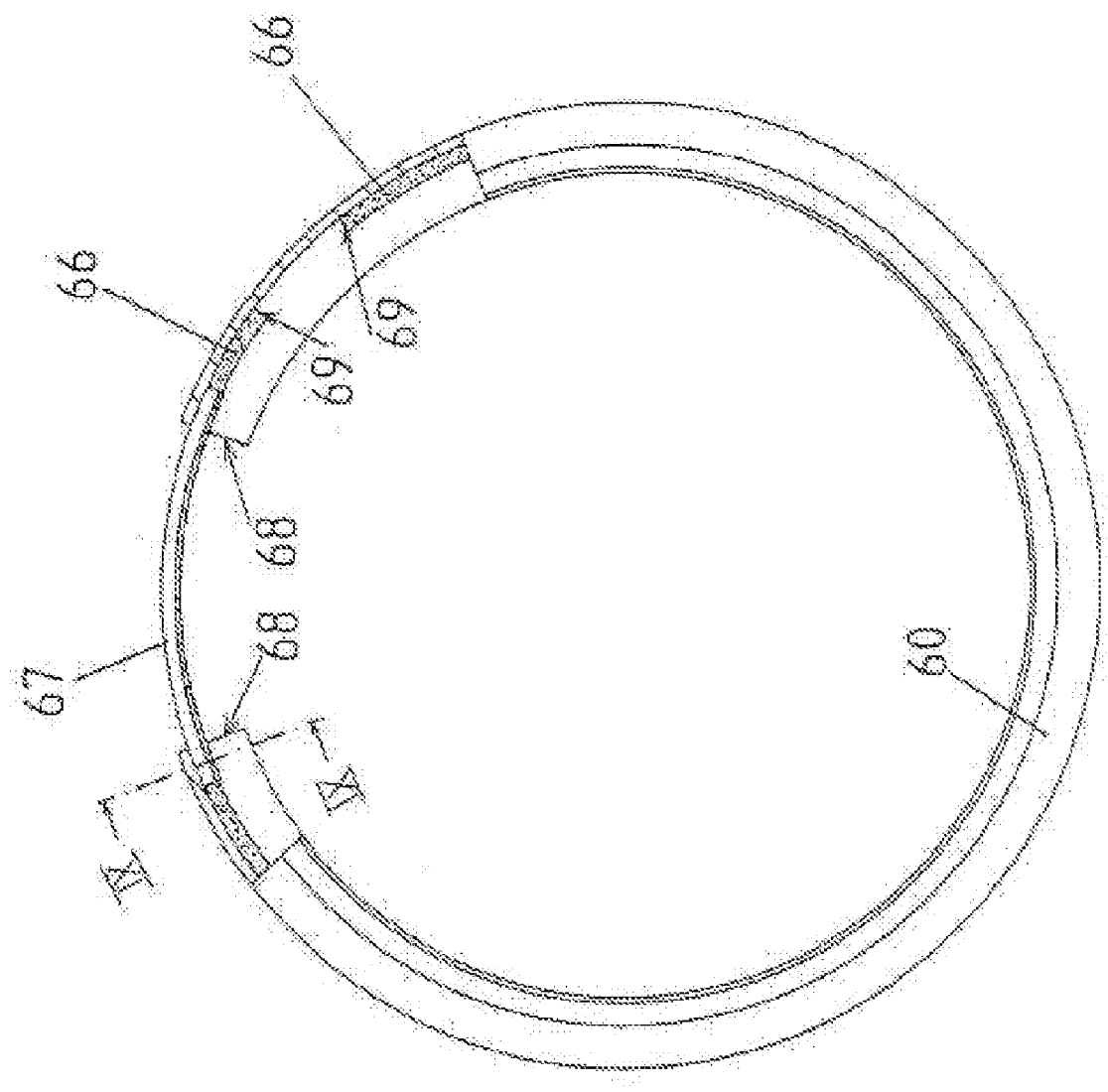
FIG. 8 is a partially open side view of a clamping ring according to a sixth embodiment.

So as to achieve complete sealing across the entire circumference of the connecting flanges, a clamping ring embodiment according to FIGS. 8 and 9 is provided. The clamping ring 60 shown here is provided with a bridge sheet metal 67 having a substantially U-shaped cross-section, which is clearly shown in the partially open side view of FIG. 8 and which bridges the opposing ends 68 of the open clamping ring 60. So as to achieve effective sealing, the ends 69 of the sealing tape 66 are not disposed beneath the abutment location of the ends 68 of the clamping ring 60, but offset thereto. The distance between the ends 69 of the sealing tape 66 is slightly smaller than the distance of the ends 68 of the clamping ring 60. In this way, upon completely closing the clamping ring 60, the ends 69 of the sealing tape 66 are pressed against one another by a compression force in a sealing manner, as a result of which it is possible to dispose the sealing tape 66 freely displaceably in the clamping ring 60 in the circumferential direction.

FIG. 9 illustrates that the cross-sectional shape of the bridge sheet metal 67 is adapted to the interior shape of the clamping ring 60, so that the bridge sheet metal 67 can be displaced inside the clamping ring 60 in the region of the ends 68. The inner leg sections 62 extending obliquely to the center cross-member 61 secure the bridge sheet metal 67 and prevent it from falling out.

LIST OF REFERENCE NUMERALS

1 Pipe
2 Terminal flange
2a Terminal flange section
3 Flange face
4 Pipe
5 Terminal flange
5a Terminal flange section
6 Exterior flange surface
7 Pipe
8 Terminal flange
8a Terminal flange section
9 Pipe
9a Stay flange
10 Clamping ring
11 Center cross-member
12 Inner leg section
13 Clamping edge
14 Outer leg section
15 Outer surface of the center cross-member
26 Sealing tape
20 Clamping ring
21 Center cross-member
22 Inner leg section
23 Clamping edge
24 Outer leg section
26 Sealing tape
30 Clamping ring
31 Center cross-member
32 Inner leg section
33 Clamping edge
34 Outer leg section
36 Sealing tape
40 Clamping ring
41 Center cross-member
42 Inner leg section
43 Clamping edge
44 Outer leg section
50 Clamping ring
51 Center cross-member
52 Inner leg section
53 Clamping edge
54 Outer leg section
56 Sealing tape
60 Clamping ring
61 Center cross-member
62 Inner leg section
63 Clamping edge
64 Outer leg section
66 Sealing tape
67 Bridge sheet metal
68 Ends of the clamping ring
69 Ends of the sealing tape
A Insertion side

The invention claimed is:

1. A one-piece, open clamping ring serving the connection of thin-walled pipes having terminal flanges, the ends of which are contractible by means of a clamping lock, the clamping ring comprising:
  an essentially U-shaped cross section with legs (12-14; 22-24; 32-34; 42-44; 52-54; 62-64) provided on the terminal flanges (2, 5, 8, 9a) which are connected with each other via a centre member (11, 21, 31, 41, 51, 61) nearly parallel extending to face edges (3, 6) and which show clamping edges that are projecting in the direction to the terminal flanges (2, 5, 8, 9a), and coming into linear contact with the terminal flanges (2, 5, 8, 9a), and extending in a circumferential direction;
  a sealing tape (16, 26, 36, 46, 56, 66) with ends (69), the sealing tape (16, 26, 36, 46, 56, 66) disposed into the clamping ring (10, 20, 30, 40, 50, 60) between an inside surface of the centre member (11, 21, 31, 41, 51, 61) and the face edges (3, 6) of the terminal flanges (2, 5, 8, 9a), wherein the sealing tape (16, 26, 36, 46, 56, 66) has a nearly rectangular or trapezoidal cross section and is displaceable in the circumferential direction of the clamping ring (10, 20, 30, 40, 50, 60);
  wherein a distance between the ends (69) of the sealing tape (66) is less than a distance between ends (68) of the clamping ring (60);
  wherein a region between the ends (69) of the sealing tape (66) is offset in relation to a region between the ends (68) of the clamping ring (60);
  a bridge element (67) is disposed in the region of the ends (68) of clamping ring (60), the bridge element (67) being adapted to an inside cross section of the clamping ring (60) and being placed displaceable in the circumferential direction between the inside surface of the centre member (61) and the sealing tape (66).

2. The clamping ring according to claim 1, wherein a distance of the clamping edges (23, 33, 43) measured in an axial direction of the pipes (1,9) is less than a double thickness of the terminal flanges (2, 5, 8) and that the legs (22-24; 32-34; 42-44) of the clamping ring (20, 30, 40) are elastic.

3. The clamping ring according to claim 2, wherein the sealing tape (16, 26, 36, 46, 56, 66) has a substantially rectangular cross-section.

4. The clamping ring according to claim 2, wherein the sealing tape (16, 26, 36, 46, 56, 66) is not firmly connected to the clamping ring (10, 20, 30, 40, 50, 60) and is displaceable in the circumferential direction.

5. The clamping ring according to claim 4, wherein the bridge element (67) is a profiled ring having a U-shaped cross-section, made of sheet metal, and which is inserted between the inside surface of the center cross-member (61) and the sealing tape (66).

6. The clamping ring according to claim 1, wherein the bridge element (67) is a cross-sectionally U-shaped profiled ring made of sheet metal.

7. The clamping ring according to claim 1, wherein the legs (12-14; 22-24; 32-34; 42-44; 52-54; 62-64) have in their cross section a shape of a flat V, an inner section (12, 22, 32, 42, 52, 62) of which being connected to the centre member (11, 21, 31, 41, 51, 61) covers with it an angle of less than 90°, that to this inner section (12, 22, 32, 42, 52, 62) is attached a projecting outer section (14, 24, 34, 44, 54, 64) of an angle more than 90°, and that the joint between these the inner section (12, 22, 32, 42, 52, 62) and the outer section (14, 24, 34, 44, 54, 64) forms a sharp-edged clamping edge (13, 23, 33, 43, 53, 63).

8. The clamping ring according to claims 1, wherein a distance between the clamping edges (13, 53) measured in an axial direction of the pipes (1, 9) corresponds to a double thickness of the terminal flanges (2, 9a) and that the clamping ring (10), 50) is made of a material that is elastically less deformable.

* * * * *